United States Patent [19]

Hintzen et al.

[11] Patent Number: 4,994,216
[45] Date of Patent: Feb. 19, 1991

[54] PROCESS OF MAKING CARBON-BONDED REFRACTORY SHAPED ARTICLES

[75] Inventors: Ullrich Hintzen, Taunusstein-Watzhahn; Heinz Schermer, Eltville; Ernst Luhrsen, Bad Schwalbach, all of Fed. Rep. of Germany

[73] Assignee: Didier-Werke AG, Wiesbaden, Fed. Rep. of Germany

[21] Appl. No.: 260,517

[22] Filed: Oct. 20, 1988

[30] Foreign Application Priority Data

Oct. 29, 1987 [DE] Fed. Rep. of Germany ....... 3736680

[51] Int. Cl.$^5$ .............................................. C01B 31/02
[52] U.S. Cl. .................................. 264/29.2; 264/29.4; 264/29.5
[58] Field of Search ...................... 264/29.2, 29.4, 29.5

[56] References Cited

U.S. PATENT DOCUMENTS 3,832,426  8/1924  Malthouse et al. ................ 264/29.4
4,199,366  4/1980  Schaefer et al. ..................... 106/97

FOREIGN PATENT DOCUMENTS 1571410  11/1970  Fed. Rep. of Germany .
2553420  6/1976  Fed. Rep. of Germany .
3245647  6/1983  Fed. Rep. of Germany .
3401054  7/1984  Fed. Rep. of Germany .
3505422  7/1986  Fed. Rep. of Germany .
1156453  6/1969  United Kingdom .

Primary Examiner—Hubert C. Lorin
Attorney, Agent, or Firm—Wenderoth, Lind & Ponack

[57] ABSTRACT

A process of making carbon-bonded refractory shapes by preparing a mix of refractory materials, pitch or tar and a binder resin, molding the mix into shapes and hardening the shapes. A starting mix is used which, based on the added quantity by weight of pitch or tar, contains 1 to 10 weight % of hollow fibers. The refractory shapes have the advantage that they exhibit less cracking, and hardly any, or even no, breaking occurs during their fabrication.

11 Claims, No Drawings

PROCESS OF MAKING CARBON-BONDED REFRACTORY SHAPED ARTICLES

BACKGROUND OF THE INVENTION

The present invention relates to a process of making carbon-bonded refractory shaped articles, particularly articles which do not exhibit flaking-off or breaking during temperature treatment.

West German Laid-open Application 32 45 647 discloses refractory building materials to which solid organic fibers, especially polypropylene fibers, are added during their fabrication. During the subsequent temperature treatment, these solid fibers form narrow interconnected passages, through which moisture can escape during the temperature treatment.

German Laid-open Application 34 01 054 teaches the addition, when producing monolithic refractory materials for the purpose of preventing flaking-off due to steam formation, of vinyl chloride acetate fibers, which soften or shrink by 50% at temperatures as low as around 40° C., i.e. at a temperature lower than the boiling point of water, in order to form channels for the escape of steam.

West German Patent Publication 15 71 410 teaches the formation, when producing tar-bonded basic refractory shapes, of channels or drains therein before or during the heat treatment, in order to thereby achieve a temporary porosity for improved full-tempering. West German Published Patent No. 15 71 410 mentions, as materials for the formation of these channels or drains, fusible, volatile and/or cokable fibers, filaments, rods or ribbons.

SUMMARY OF THE INVENTION

The object of the present invention is, when making carbon-bonded refractory shapes fabricated by concomitant use of an organic binder resin and pitch and/or tar, to prevent flaking-off or breaking during the temperature treatment, and to make refractory shapes of this type which exhibit only slight, or even no, increase in porosity.

A surprising finding was that this object can be achieved by adding to the starting mix hollow fibers in a specified quantity.

DETAILED DESCRIPTION OF THE INVENTION

The fabrication of carbon-bonded refractory shapes is known in itself. In this regard, reference is made to, for example, West German Laid-open Application 25 53 420 and West German Patent No. 35 05 422. The known process can be used in accordance with the present invention, except that hollow fibers, preferably hollow organic fibers, are added to the starting mix in a specified quantity.

More particularly, the present invention provides a process of making a carbon-bonded refractory shaped article which comprises providing a mixture containing (a) refractory material, (b) binder resin, (c) a carbonaceous substance selected from the group consisting of pitch, tar and a mixture thereof, and (d) 1 to 10 weight % of hollow fibers based on the weight of the carbonaceous substance; molding the mixture into a shaped article; and hardening the shaped article.

As a result, during the hardening of the shapes after their molding, which takes place at temperatures up to 250° C., and during the subsequent pyrolysis or tempering treatment carried out at temperatures up to 1000° C., and during the reductive firing treatment carried out as necessary and occurring at temperatures up to 1600° C., the formation of cracks can be prevented with assurance, that is to say, no degassing problems occur.

According to a preferred embodiment of the invention, fibers of natural cellulose are used as the hollow organic fibers. This has the advantage that the cellulose fibers decompose at temperatures around 180° C., i.e. after the binder resin has hardened at least partly, so that the channels formed are preserved and do not collapse; thus, enough opportunity arises for the escape of the gases, in addition to steam, generated from the tar or pitch or as a result of the decomposition of products.

According to a further preferred embodiment, the cellulose fibers are used with a maximum length of 2 mm, or 1 mm. The strength of the shapes produced is increased considerably by the use of such fibers. Moreover, as a result of the formation of relatively short channels following decomposition of the short cellulose fibers, the length of the remaining pores can be shortened, so that penetration of metal melts, e.g. steel melts, when the refractory shapes are being used is only to a slight extent, or even does not occur at all.

According to a further preferred embodiment, the proportion of hollow fibers, relative to all of the solids in the starting mix, is 1 weight % maximum. As a result, the porosity ultimately achieved in the tempered or fired refractory shape is increased only slightly, e.g. by 2% maximum. However, if there is any impregnation with tar later on, such a value of porosity is very suitable for the absorption of the tar.

According to another preferred embodiment, up to 10 weight %, preferably 2 to 8 weight %, tar and/or pitch is used in the starting mix, based on the solids weight. This results in the production of refractory shapes with excellent properties.

According to still another preferred embodiment, up to 10 weight %, preferably 2 to 8 weight %, based on the solids weight, of one or more organic binder resins are used in the starting mix, resulting in good strength during hardening, thus lowering the risk of breaking of the shapes during tempering or pyrolysis or during the reductive firing which may be carried out if necessary.

Preferred organic binder resins are phenol resins, e.g. phenol-resol resins and phenol-novolak resins, furan resins, modified furan resins, and epoxy resins, which are used either in solid form as powders, or as solutions in a suitable solvent, either water or organic solvent.

According to yet another preferred embodiment, up to 10 weight %, preferably 2 to 8 weight % of particulate, i.e. finely divided, silicon metal, preferably with a particle size of smaller than 0.09 mm, is also added, based on the solids weight including the silicon metal, to improve or to obtain desired properties in the finished refractory shape.

Furthermore, when making highly carbon-rich refractory shapes, it is preferred to add up to 10 weight %, preferably 2 to 8 weight %, of particulate, i.e. finely divided, carbon black and/or graphite, especially flake graphite. In this way, the properties of the finished refractory shapes can also be varied.

The refractory materials used for the refractory shapes in the invention may be any desired materials employed in this field, and they are utilized in the usual particle-size distribution, e.g. with particle sizes of 0.09 to 6 mm, the maximum particle sizes being dependent on the desired use of the refractory shapes. They may also be smaller, e.g. 2 or 4 mm. The use of mullite, zirconium mullite, tabular alumina, corundum and silicon carbide (SiC) is preferred. The use of mixtures of refractory materials is also possible.

Any hollow fibers can be used in accordance with the present invention, although organic fibers, e.g. cellulose fibers, are preferred. The preparation of such hollow fibers is well known in the art.

Advantageously, the first stage for the preparation of the starting mix is to mix the hollow fibers with the solid refractory materials and only thereafter to add a mixture of binder resin and the pitch or tar as a so-called cold mix, followed by further thorough mixing and shaping. However, it is also possible to add a separately prepared premix of tar or pitch with the fibers to the mixture of refractory materials and binder resin.

After the shaping, hardening of the binder resin is carried out, usually at temperatures of 80° to 250° C. If necessary, this may be preceded by a drying stage if a water-containing binder resin, such as a resol solution, is used.

Thereafter, the tempering treatment or pyrolysis of fibers and binder and, if applicable, the tar or pitch may be carried out at temperatures between 200° and 1000° C., preferably between 200° and 600° C. Hardening and tempering temperatures may partly overlap. Finally, a firing process may also be carried out under reducing conditions at temperatures up to 1600° C.

The invention will be explained in greater detail by reference to the following example.

EXAMPLE

A starting mix was prepared from the following materials:

| Component | Particle size | Amount (parts by weight) |
| --- | --- | --- |
| Tabular alumina | up to 0.04 mm | 25 |
| Tabular alumina | >0.04 to 0.3 mm | 10 |
| Tabular alumina | >0.3 to 0.6 mm | 10 |
| Tabular alumina | >0.6 to 1.2 mm | 15 |
| Tabular alumina | >1.2 to 2.4 mm | 10 |
| Zirconium mullite | up to 0.5 mm | 10 |
| Zirconium mullite | >0.5 to 1.0 mm | 10 |
| Silicon metal | below 0.2 mm | 5 |
| Carbon black | finely divided | 5 |
| Pitch | flour-like | 5 |
| Phenol-resol resin | — | 7 |
| Cellulose fibers, fiber length 1 mm* | — | 0.5 |

*Commercial product with the trademark "Arbocel", fiber diameter about 20 microns.

The starting materials were mixed in the indicated sequence in a positive mixer, pressed isostatically into bricks, dried at 80° C. for 4 hr, then hardened at 185° C. for 3 hr and finally tempered or pyrolyzed at 900° C. under a reducing atmosphere for 8 hr.

No cracking or breaking of the bricks was observed.

We claim:

1. A process of making a carbon-bonded refractory shaped article which comprises:
   providing a mixture containing (a) refractory material, (b) binder resin, (c) a carbonaceous substance selected from the group consisting of pitch, tar and a mixture thereof, and (d) 1 to 10 weight % of hollow fibers based on the weight of said carbonaceous substance;
   molding said mixture into a shaped article;
   hardening the shaped article at temperatures up to 250° C.;
   tempering the hardened shaped article at temperatures up to 1000° C.; and
   firing the heat-tempered shaped article at temperatures up to 1600° C.

2. The process according to claim 1, wherein said hollow fibers are cellulose fibers.

3. The process according to claim 2, wherein said cellulose fibers have a maximum length of 2 mm.

4. The process according to claim 2, wherein said cellulose fibers have a maximum length of 1 mm.

5. The process according to claim 1, wherein said mixture contains said hollow fibers in an amount up to 1 weight % based on the weight of solids in said mixture.

6. The process according to claim 1, wherein said mixture contains said carbonaceous substance in an amount up to 10 weight % based on the weight of solids in said mixture.

7. The process according to claim 1, wherein said mixture contains said binder resin in an amount up to 10 weight % based on the weight of solids in said mixture.

8. The process according to claim 1, wherein said binder resin is selected from the group consisting of a phenol resin, a furan resin, a modified furan resin, an epoxy resin and a mixture thereof.

9. The process according to claim 1, wherein said refractory material is selected from the group consisting of tabular alumina, zirconium mullite, mullite, corundum, silicon carbide, and a mixture thereof.

10. The process according to claim 1, wherein said mixture further contains particulate silicon metal in a positive amount up to 10 weight % based on the weight of solids in said mixture.

11. The process according to claim 1, wherein said mixture further contains a positive amount up to 10 weight % of a particulate member selected from the group consisting of carbon black, graphite and a mixture thereof.

* * * * *